US009225386B2

United States Patent
Asokan

(10) Patent No.: US 9,225,386 B2
(45) Date of Patent: Dec. 29, 2015

(54) METHOD FOR PLACEMENT OF FINGERS WITH G-RAKE ADVANCED RECEIVER

(75) Inventor: Ram Asokan, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2400 days.

(21) Appl. No.: 11/955,084

(22) Filed: Dec. 12, 2007

(65) Prior Publication Data

US 2009/0131011 A1    May 21, 2009

Related U.S. Application Data

(60) Provisional application No. 60/989,362, filed on Nov. 20, 2007.

(51) Int. Cl.
| | | |
|---|---|---|
| *H04B 17/02* | (2006.01) | |
| *H04B 1/06* | (2006.01) | |
| *H04B 7/00* | (2006.01) | |
| *H04B 1/712* | (2011.01) | |
| *H04B 1/7117* | (2011.01) | |

(52) U.S. Cl.
CPC .............. *H04B 1/712* (2013.01); *H04B 1/7117* (2013.01); *H04B 2201/709727* (2013.01)

(58) Field of Classification Search
CPC ................ H04B 1/7115; H04B 2201/709727
USPC ................ 455/132–135, 137, 140, 272–273, 455/275–278.1; 375/142, 144, 147, 148, 375/150, 343, 347, 349
See application file for complete search history.

(56) References Cited

U.S. PATENT DOCUMENTS

| | | | |
|---|---|---|---|
| 6,683,924 B1 * | 1/2004 | Ottosson et al. | 375/343 |
| 6,724,808 B1 * | 4/2004 | Ohshima | 375/147 |
| 6,922,434 B2 * | 7/2005 | Wang et al. | 375/148 |
| 7,088,955 B2 * | 8/2006 | Challa et al. | 455/63.3 |
| 7,142,585 B2 * | 11/2006 | Baltersee et al. | 375/148 |
| 7,317,760 B2 * | 1/2008 | Jeong et al. | 375/260 |

(Continued)

FOREIGN PATENT DOCUMENTS

WO    2007/025749    3/2007

OTHER PUBLICATIONS

Kutz et al., "On the Performance of a Practical Downlink CDMA Generalized RAKE Receiver", 2002 IEEE 56th, Vehicular Technology Conference Proceedings, vol. 3, 2002, pp. 1352-1356.

(Continued)

*Primary Examiner* — Simon Nguyen
(74) *Attorney, Agent, or Firm* — Renner, Otto, Boisselle & Sklar, LLP.

(57) ABSTRACT

An electronic device includes a Rake receiver for receiving wireless signals, wherein the Rake receiver includes a predetermined number of fingers and a combiner. The Rake receiver also includes a channel detection circuit configured to identify at least one channel tap in a received signal, and a placement circuit configured to place a finger of the predetermined number of fingers at a location corresponding to the at least one identified channel tap. If all of the predetermined number of fingers are not associated with a corresponding channel tap, unplaced fingers of the predetermined number of fingers are placed at locations based on a signal-to-interference ratio estimate at an output of the combiner.

18 Claims, 3 Drawing Sheets

(56) References Cited

U.S. PATENT DOCUMENTS

| | | | |
|---|---|---|---|
| 7,372,897 B2* | 5/2008 | Fukada | 375/150 |
| 7,403,557 B2* | 7/2008 | Pan et al. | 375/148 |
| 7,430,253 B2* | 9/2008 | Olson et al. | 375/316 |
| 7,469,024 B2* | 12/2008 | Khayrallah et al. | 375/347 |
| 2004/0062327 A1* | 4/2004 | Yang | 375/347 |
| 2005/0130616 A1* | 6/2005 | Khayrallah et al. | 455/242.2 |
| 2005/0201447 A1* | 9/2005 | Cairns et al. | 375/148 |
| 2006/0176937 A1* | 8/2006 | Bottero et al. | 375/147 |
| 2007/0071072 A1* | 3/2007 | Banister et al. | 375/148 |
| 2007/0098048 A1 | 5/2007 | Cairns et al. | |
| 2009/0296787 A1* | 12/2009 | Reznik et al. | 375/148 |

OTHER PUBLICATIONS

International Search Report and Written Opinion for International Application No. PCT/US08/64216 dated Aug. 26, 2008.

* cited by examiner

METHOD FOR PLACEMENT OF FINGERS WITH G-RAKE ADVANCED RECEIVER

RELATED APPLICATION DATA

This application claims priority of U.S. Provisional Application No. 60/989,362 filed on Nov. 20, 2007, which is incorporated herein by reference in its entirety.

TECHNICAL FIELD OF THE INVENTION

The present invention relates generally to electronic devices, such as electronic devices for engaging in voice and data communications. More particularly, the invention relates to a device and method for placing fingers of a rake receiver.

DESCRIPTION OF THE RELATED ART

Wireless communications have become prevalent in business, personal, and other applications, and as a result the technology for such communications continues to advance in various areas. One such advancement includes the use of spread spectrum communications, including that of wideband code division multiple access ("WCDMA"). In such communications, a user station (e.g., a hand held cellular phone) communicates with a base station, where typically the base station corresponds to a "cell". WCDMA systems are characterized by simultaneous transmission of different data signals over a common channel by assigning each signal a unique code.

Today's wireless communication devices employ Rake receivers, which collect signal energy that has been dispersed in time by the multi-path radio channel (e.g., signal energy is collected from different delayed versions of a transmitted signal). Finger placement in a Rake receiver is based on channel taps, and the fingers are placed where the signal is strongest. The Rake receiver extracts signal energy from delayed signal images by delaying, de-spreading and combining them. Each de-spread value (also called fingers) consists of a signal component, an interference component, and a noise component. When combining the values, the Rake receiver aligns the signal components so that they add to one another, creating a larger signal component.

Generalized Rake (G-Rake) receivers are similar to Rake receivers, but include several differences. A first difference between a Rake receiver and a G-Rake receiver is that the G-Rake receiver selects finger placement based on an estimate of a signal-to-interference ratio (S/I) at an output of the Rake combiner, and not based on strength of the signal. The G-Rake receiver uses the "interference" fingers (the fingers not receiving a signal) to collect information about interference on the "signal" fingers (the fingers actually receiving the signal). This interference might result from neighboring symbols of interest, symbols intended for other users in the cell, or symbols intended for other users in other cells. The extra fingers capture information about the interference, and this information is used to cancel interference on the signal fingers.

A second difference between Rake receivers and G-Rake receivers is that a separate method is used to form combining weights. Rake receivers use weights based on estimated channel response, while G-Rake receivers additionally use the correlation between the impairment (interference plus noise) on different fingers. This information can be used to suppress interference.

SUMMARY

G-Rake receivers tend to provide better performance than Rake receivers. In a G-Rake receiver, fingers may be placed in locations where signals are absent, and this can provide data regarding interference. Information regarding interference enables cancellation of such interference and/or improvement of signal-to-interference ratio at the combiner output. A drawback to conventional G-Rake receivers, however, is that all strong signals may not have a corresponding finger assigned thereto. This can hurt performance of the receiver in a benign channel condition (i.e., in situations when the signal is not interference limited).

In accordance with the present invention, there is provided a device and method for placing fingers in a Rake receiver, such as a G-Rake receiver, wherein the fingers are first placed for channel taps based on signal strength. Unused fingers then are placed based on an estimated signal-to-interference ratio (S/I) at a combiner output of the receiver. The fingers may be arranged in a fixed finger configuration, wherein a predetermined number of fingers are allocated for placement at channel taps based signal strength, and a predetermined number of fingers are allocated for placement based on S/I at the combiner output. Alternatively, finger allocation may be variable, wherein the allocation can be based on signal characteristics (e.g., the number of strong signal regions) and/or S/I characteristics at the combiner output.

According to one aspect of the invention, an electronic device, includes: a Rake receiver for receiving wireless signals, said Rake receiver including a despreader with a predetermined number of fingers and a combiner for combining de-spreaded signals; a channel detection circuit configured to identify a channel tap in a received signal; and a placement circuit configured to place a finger of the predetermined number of fingers at a location corresponding to each identified channel tap, wherein unplaced fingers of the predetermined number of fingers are placed at locations based on an estimated signal-to-interference ratio (S/I) at an output of the combiner.

According to one aspect of the invention, the placement circuit is configured to allocate a first fixed number of fingers of the predetermined number of fingers for placement at locations corresponding to the channel taps, and to allocate a second fixed number of fingers of the predetermined number of fingers for placement based on the estimated S/I at the combiner output.

According to one aspect of the invention, the placement circuit is configured to dynamically allocate each finger of the predetermined number of fingers between channel taps and estimated S/I.

According to one aspect of the invention, the placement circuit is configured to dynamically allocate the fingers based on signal conditions.

According to one aspect of the invention, the electronic device further includes a weighting circuit configured to apply a weight factor to at least one finger of the predetermined number of fingers.

According to one aspect of the invention, the weighting circuit is further configured to apply the weight factor to the at least one finger based on signal strength and on an estimated signal-to-interference ratio at the output of the combiner.

According to one aspect of the invention, the weighting circuit is further configured to dynamically change the weight factor based on signal conditions.

According to one aspect of the invention, the Rake receiver is a generalized Rake (G-Rake) receiver.

According to one aspect of the invention, the electronic device is a mobile telephone.

According to one aspect of the invention, the electronic device is at least one of a communicator, electronic organizer, personal digital assistant, smart phone, portable communication apparatus, portable gaming device, or portable media devices.

According to one aspect of the invention, a method for setting fingers of a Rake receiver, said receiver including a combiner for combining de-spreaded signals and a predetermined number of fingers, the method including: identifying channel taps in a received signal; placing a finger of the predetermined number of fingers at a location corresponding to each identified channel tap; and placing unplaced fingers of the predetermined number of fingers at locations based on an estimated signal-to-interference ratio at an output of the combiner.

According to one aspect of the invention, placing includes dynamically allocating each finger of the predetermined number of fingers between channel taps and estimated S/I.

According to one aspect of the invention, allocating includes allocating each finger based on signal conditions.

According to one aspect of the invention, the method further includes applying a weight factor to each finger of the predetermined number of fingers.

According to one aspect of the invention, applying the weight factor to each finger includes applying the weight factor to each finger based on signal strength and on S/I.

According to one aspect of the invention, the method further includes dynamically changing the weight factor based on signal conditions.

According to one aspect of the invention, a computer program embodied on a machine readable medium for setting fingers of a Rake receiver, said receiver including a combiner for combining de-spreaded signals and a predetermined number of fingers, includes: code that identifies channel taps in a received signal; code that places a finger of the predetermined number of fingers at a location corresponding to each identified channel tap; and code that places unplaced fingers of the predetermined number of fingers at locations based on an estimated signal-to-interference ratio at an output of the combiner.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
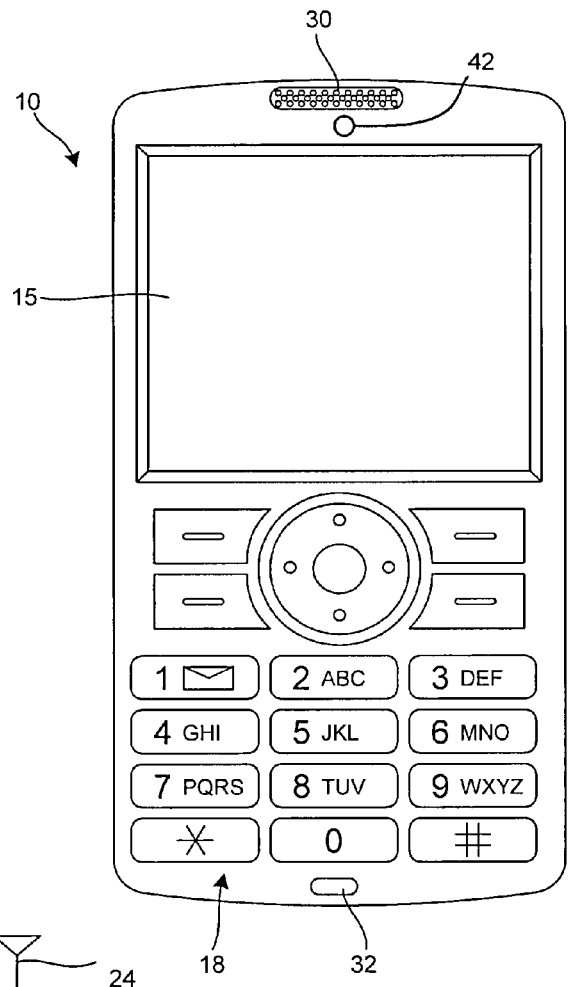
FIG. 1 is a schematic view of a mobile telephone as an exemplary electronic device in accordance with an embodiment of the present invention.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smart phones, portable communication apparatus, portable gaming devices, portable media devices (video and/or audio), and the like.

In the present application, embodiments of the invention are described primarily in the context of a mobile telephone. However, it will be appreciated that the invention is not intended to be limited to the context of a mobile telephone and may relate to any type of appropriate electronic equipment.

Figure 2:
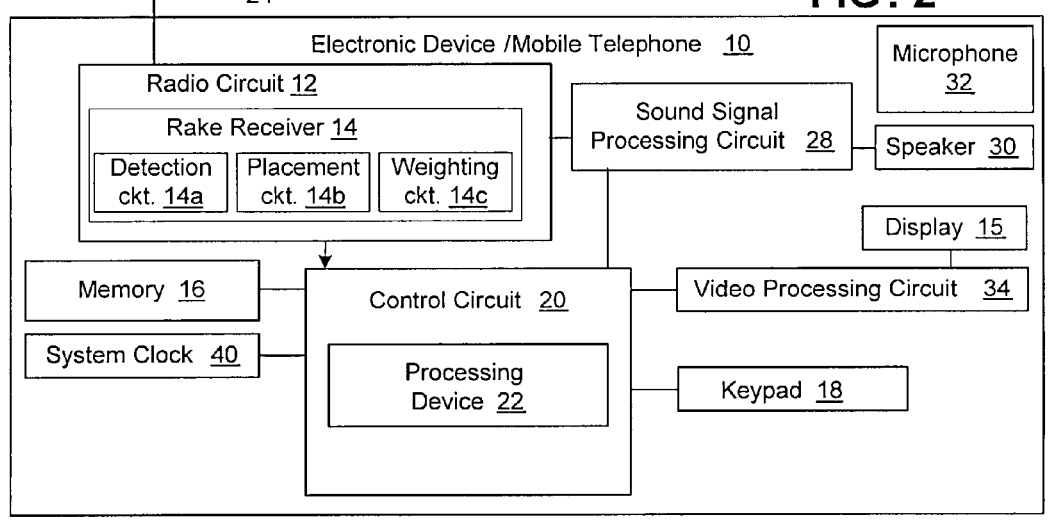
FIG. 2 is a schematic block diagram of the relevant portions of the mobile telephone of FIG. 1 in accordance with an embodiment of the present invention.

Referring initially to FIGS. 1 and 2, an electronic device 10 is shown. The electronic device 10 includes a radio circuit 12 comprising a Rake receiver 14 (e.g., a generalized Rake receiver) that includes a predetermined number of fingers, despreader and a combiner. The fingers of the Rake receiver are placed based on a strength of a signal at channel taps received by the Rake receiver 14, and on an estimated signal-to-interference ratio (S/I) at an output of the combiner. Additional details and operation of the Rake receiver 14 will be described in greater detail below.

The electronic device of the illustrated embodiment is a mobile telephone and will be referred to as the mobile telephone 10. The mobile telephone 10 is shown as having a brick or block form factor, although other form factors, such as a "flip-open" form factor (e.g., a "clamshell" housing) or a slide-type form factor (e.g., a "slider" housing) also my be utilized.

The mobile telephone 10 may include a display 15. The display 15 displays information to a user such as operating state, time, telephone numbers, contact information, various navigational menus, etc., which enable the user to utilize the various features of the mobile telephone 10. The display 15 also may be used to visually display content received by the mobile telephone 10 and/or retrieved from a memory 16 (FIG. 2) of the mobile telephone 10.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Keys or key-like functionality also may be embodied as a touch screen associated with the display 15. Also, the display 15 and keypad 18 may be used in conjunction with one another to implement soft key functionality.

The mobile telephone 10 includes call circuitry (e.g., the radio circuit 12, antenna 24, sound signal processing circuit 28, speaker 30 and microphone 32, and/or control circuit 20) that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form.

FIG. 2 represents a functional block diagram of the mobile telephone 10. For the sake of brevity, generally conventional features of the mobile telephone 10 will not be described in great detail herein.

The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10. The memory 16 may include a read only memory area that is implemented using nonvolatile memory, and a random access or system memory area that is implemented using volatile memory.

Continuing to refer to FIGS. 1 and 2, the mobile telephone 10 includes an antenna 24 coupled to the radio circuit 12. The radio circuit 12 includes a radio frequency transmitter and receiver for transmitting and receiving signals via the antenna 24 as is conventional. The radio circuit 12 may be configured to operate in a mobile communications system and may be used to send and receive data and/or audiovisual content. The radio circuit 12 includes the Rake receiver 14, such as a generalized Rake (G-Rake) receiver. The Rake receiver 14 includes a channel detection circuit 14a, a placement and dispreading circuit 14b and a weighting and combining circuit 14c. The Rake receiver 14, channel detection circuit 14a, placement circuit 14b and weighting circuit 14c will be described in more detail below.

The mobile telephone 10 further includes a sound signal processing circuit 28 for processing audio signals transmitted by and received from the radio circuit 12. Coupled to the sound processing circuit 28 are a speaker 30 and a microphone 32 that enable a user to listen and speak via the mobile telephone 10 as is conventional. The radio circuit 12 and sound processing circuit 28 are each coupled to the control circuit 20 so as to carry out overall operation. Audio data may be passed from the control circuit 20 to the sound signal processing circuit 28 for playback to the user. The sound processing circuit 28 may include any appropriate buffers, decoders, amplifiers and so forth.

The display 15 may be coupled to the control circuit 20 by a video processing circuit 34 that converts video data to a video signal used to drive the display 15. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 12 or obtained by any other suitable method.

The mobile telephone 10 also may include a system clock 40 for clocking the various components of the mobile telephone 10, such as the control circuit 20. The control circuit 20 may, in turn, carry out timing functions, such as timing the durations of calls, generating the content of time and date stamps, and so forth.

Figure 3:
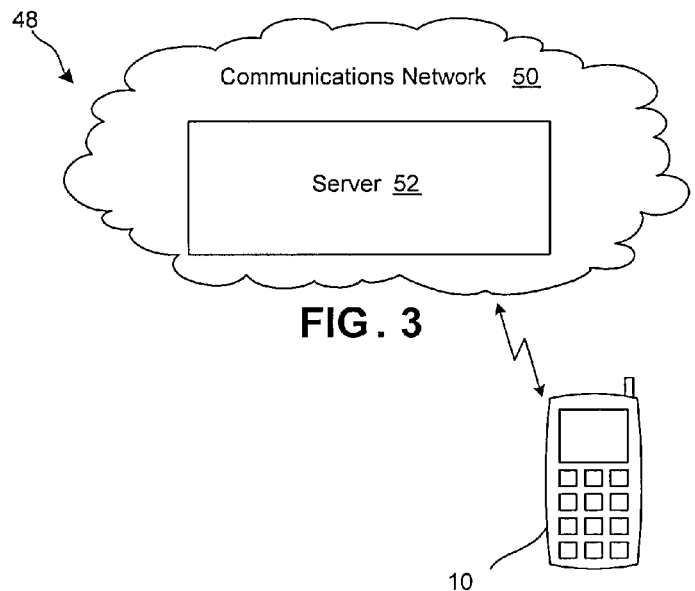
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices.

As will be appreciated, the server 52 may be configured as a typical computer system used to carry out server functions and may include a processor configured to execute software containing logical instructions that embody the functions of the server 52 and a memory to store such software.

Figure 4:
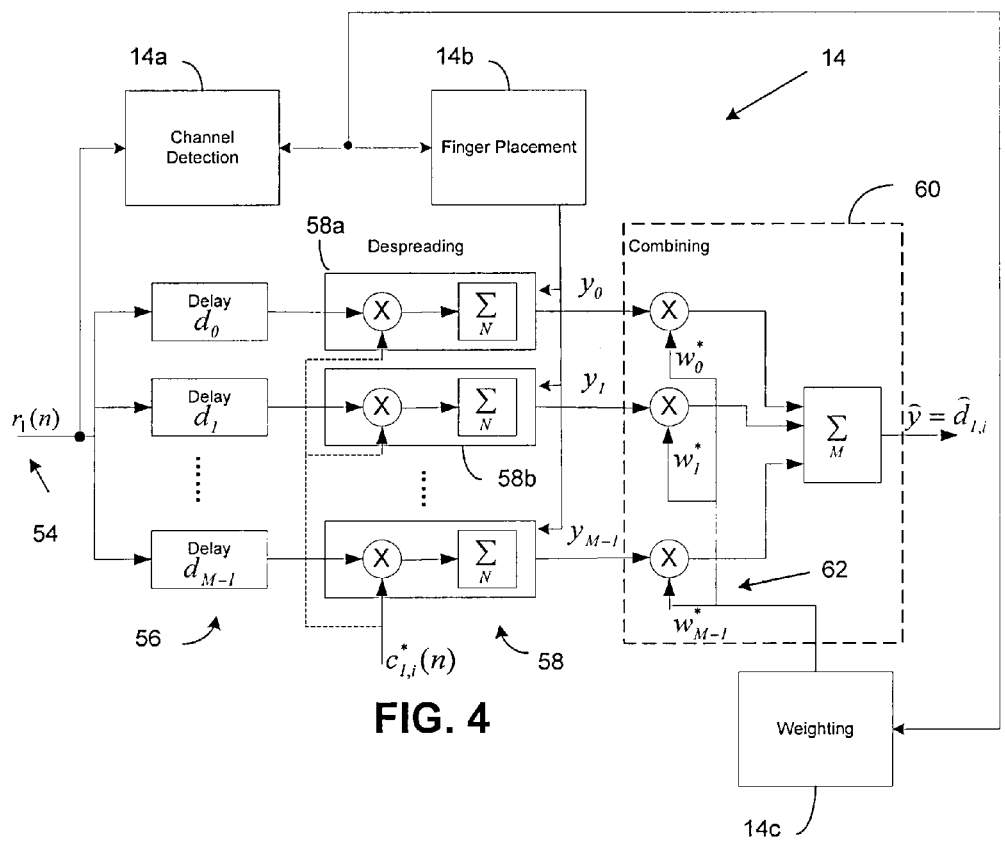
FIG. 4 is a block diagram of an exemplary Rake receiver in accordance with the invention.

Moving now to FIG. 4, an exemplary Rake receiver 14 in accordance with the invention is shown in block diagram form. Functions of the Rake receiver 14 include 1) de-spreading of an incoming signal, and 2) combining the de-spreaded components into a single signal. A received signal 54 (e.g., $r_1(n)$) of the Rake receiver 14 may be composed of a number of copies of the transmitted signal with different time shifts 56 (e.g., $d_0$-$d_{M-1}$). De-spreaded copies of the received signal, called Rake fingers 58, are obtained through time-shift correlation with a chip sequence. Combining is performed by a combiner 60, which implements a weighted sum of the finger outputs to construct a single signal. Ideally, the combining weights 62 for the fingers are estimated such that the receiver's performance is maximized. In a traditional Rake receiver, the combining weight vectors are simply the channel response weight vector. In a G-Rake receiver, the combining weight vectors are determined to suppress interference on the signal. This interference might result from neighboring data symbols of interest, data symbols intended for other users in the cell, or data symbols intended for other users in other cells. The extra fingers used by the Rake receiver capture information about the interference, and this information is used to cancel interference on the signal fingers.

A channel detection circuit 14a, placement circuit 14b and weighting circuit 14c form part of the Rake receiver 14.

Although shown as part of the Rake receiver, the respective circuits 14a, 14b and 14c may be separate from the Rake receiver.

The channel detection circuit 14a monitors signal energy collected from the different delayed versions 56 of the received signal 54 and identifies parts of the signal energy that have high signal strength. High signal strength is used herein in the relative sense, e.g., the strength of a part of the received signal relative to the strength of other parts of the received signal. To identify portions of the received signal 54 that have high signal strength, the channel detection circuit may utilize a memory circuit in conjunction with one or more comparator circuits, for example. The strength of the each portion of the received signal can be compared to predetermined levels and the result of the comparison can be stored in memory. Based on this stored data, portions of the signal with high signal strength can be identified. Regions or points of the received signal that are identified as having relatively high signal strength or high energy are referred to as peaks or channel taps 64, and are typically found at integer multiples of the chip interval.

Figure 5:
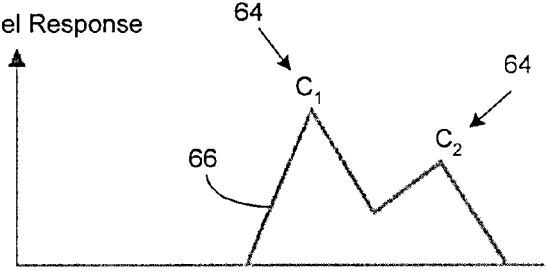
FIG. 5 is a graph illustrating channel taps in a received signal.

Briefly referring to FIG. 5, two channel taps 64 are shown. More specifically, a channel response 66 is shown wherein multiple images of the transmitted signal are present. As can be seen in FIG. 5, the channel response 66 includes two regions C1 and C2 of relatively high signal energy (higher than other portions of the signal). These regions, referred to as peaks or channel taps 64, are identified by the channel detection circuit 14a, and their location is provided to the placement circuit 14b.

The placement circuit 14b, after receiving the location of the channel taps 64 from the channel detection circuit 14a, places a first finger 58a of the Rake receiver 14 at a location corresponding to a first channel tap 64 (e.g., C1) (e.g., the finger is tuned for that particular tap). Then, the placement circuit 14b places a second finger 58b at a location corresponding to a second channel tap 64 (e.g., C2). This process is repeated until each channel tap 64 is associated with a finger 58 of the Rake receiver 14, or until all fingers 58 have been assigned to a channel tap 64. By assigning a finger 58 to each channel tap 64, portions of the signal that have high signal energy are not missed. This is particularly advantageous when interference is not a major impairment of the signal 54.

After the placement circuit 14b has assigned a finger 58 to each channel tap 64, then, if there are unused fingers, these unused fingers are placed so as to optimize a signal-to-interference ratio at the output of the combiner 60. More specifically, the unused fingers are placed based on an estimated signal-to-interference ratio at the combiner output. This may be done, for example, by randomly placing one or more fingers at various locations (e.g., place "x"), and then estimating the S/I at the combiner output. This can be repeated in an iterative process so as to find an optimum location for the fingers such that S/I at the combiner output is maximized.

The fingers placed in this manner then can be used to capture data for canceling interference on the signal fingers (the fingers corresponding to the channel taps 64 (e.g., C1 and C2)). For example, assuming a Rake receiver 14 designed for five fingers and a received signal 54 with five channel taps 64, then the channel detection circuit 14a will identify the five channel taps and communicate their location to the placement circuit 14b. The placement circuit 14b then will locate one finger at each channel tap.

Since each of the five fingers is allocated to a corresponding channel tap, there are no unused fingers and, thus, no fingers are available based on S/I. Now, assuming the received signal 54 has three channel taps 64, then the channel detection circuit 14a will identify the three channel taps and communicate their location to the placement circuit 14b. The placement circuit 14b then will place three of the five fingers at locations corresponding to the three channel taps 64. Further, since only three fingers have been used, then there are two unused fingers. These unused fingers then are placed so as to minimize the signal-to-noise interference at an output of the combiner 60.

Allocation of the fingers may be fixed or variable. In a fixed allocation scheme, a predetermined number of fingers are reserved for placement at locations corresponding to channel taps, and a predetermined number of fingers are reserved for S/I band placement. For example, in a five finger Rake receiver, three fingers may be reserved for placement at channel taps, and two fingers may be reserved for placement so as to maximize S/I at the combiner output. In variable allocation, the fingers of the Rake receiver are not reserved for a particular use. Instead, they may are free to be assigned as needed. The assignment can be based on signal strength and/or on S/I at the combiner output. Further, the allocation can be dynamically changed based on channel conditions.

Additionally, weighting factors 62 (e.g., $W_0$, $W_1$, etc.) can be applied to the each finger output. More specifically, the weighting circuit 14c can calculate a weight factor 62, wherein the weight factor scales an output of a respective finger 58. Thus, certain fingers can be made more or less dominant than other fingers.

The weighting circuit 14c can calculate the weight factors 62 based on signal strength. For example, fingers associated with strong portions of the signal may be given more weight than fingers associated with weaker portions of the signal. Alternatively (or in conjunction with the above), the weighting circuit may calculate the weight factors based on an estimated signal-to-interference ratio at the output of the combiner 60. In either case, the weights may be fixed, or they may be dynamically changed based on channel conditions.

Figure 6:
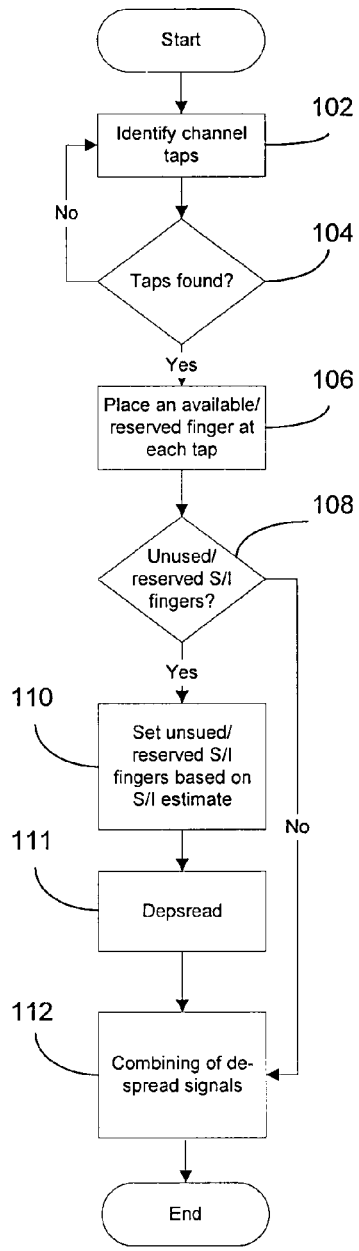
FIG. 6 is a flow chart of a method of placing fingers of a Rake receiver in accordance with the invention.

With additional reference to FIG. 6, illustrated are logical operations to implement an exemplary method for placing fingers in a Rake receiver of the mobile telephone 10. The flow chart 100 of FIG. 6 may be thought of as depicting steps of a method carried out by the mobile telephone 10. Although FIG. 6 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow for finger placement may begin at block 102, wherein channel taps 64 are identified within a received signal 54. As noted herein, channel taps 64 are portions of the signal 54 that have relatively higher signal energy than other portions of the signal. At block 104, it is determined if channel taps are found in the received signal 54. If channel taps 64 are not found in the received signal, then the method moves to block 102. If, however, channel taps are found in the received signal, then at block 106 a finger 58 is placed at each channel tap 64. In a fixed allocation scheme, only those fingers allocated for signal detection are placed for signal detection. In a variable or dynamic scheme, any or all fingers may be placed for signal detection. By locating a finger to correspond with each channel tap (or a number of channel taps), it is ensured that strong portions of the received signal are captured and processed by the Rake receiver 14.

After a finger is placed at each identified tap (or after all reserved fingers have been allocated), then at block 108 it is determined if there are any unused (or allocated) fingers in the Rake receiver. If all fingers have been associated with a corresponding channel tap, then the method moves to block 112, which is described below. If, however, there are unused (or allocated) fingers, then the unused/allocated fingers are set so as to maximize a signal-to-interference ratio at the output of the combiner 60 as indicated at block 110. For example, the unused/allocated fingers can be placed at random locations, and then an estimate of the S/I at the combiner output can be calculated. This process can be repeated until an optimum location is found for each unused/allocated finger that maximizes S/I at the combiner output.

At block 111, the received signal is despread, and at block 112, combining is performed, wherein weighting factors can be applied to the output of each finger 58. The weighting factors may be based on a strength of the signal associated with each finger (e.g., stronger signals are weighted higher than weaker signals), and/or based on a signal-to-interference ratio associated with each finger (fingers are weighted so as to minimize interference). Further, the weighting factors may be fixed, or they may be dynamically changed based on channel conditions.

Accordingly, a device and method for setting fingers in a Rake receiver is disclosed. The device and method enable improved performance of the receiver with both signals having minimal to no interference and with signals that include an interference component.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electronic device, comprising:
a Rake receiver for receiving wireless signals, said Rake receiver including a predetermined number of fingers and a combiner for combining de-spreaded signals;
a channel detection circuit configured to identify a channel tap in a received signal; and
a placement circuit configured to place at least one finger of the predetermined number of fingers at a location corresponding to an identified channel tap, and to place at least one unplaced finger of the predetermined number of fingers at a location based on an estimated signal-to-interference ratio (S/I) at an output of the combiner.

2. The electronic device according to claim 1, wherein the placement circuit is configured to allocate a first fixed number of fingers of the predetermined number of fingers for placement at locations corresponding to the channel taps, and to allocate a second fixed number of fingers of the predetermined number of fingers for placement based on the estimated S/I at the combiner output.

3. The electronic device according to claim 1, wherein the placement circuit is configured to dynamically allocate each finger of the predetermined number of fingers between channel taps and estimated S/I.

4. The electronic device according to claim 3, wherein the placement circuit is configured to dynamically allocate the fingers based on signal conditions.

5. The electronic device according to claim 1, further comprising a weighting circuit configured to apply a weight factor to at least one finger of the predetermined number of fingers.

6. The electronic device according to claim 5, wherein the weighting circuit is further configured to apply the weight factor to the at least one finger based on signal strength and on an estimated signal-to-interference ratio at the output of the combiner.

7. The electronic device according to claim 5, where the weighting circuit is further configured to dynamically change the weight factor based on signal conditions.

8. The electronic device according to claim 1, wherein the Rake receiver is a generalized Rake (G-Rake) receiver.

9. The electronic device according to claim 1, wherein the electronic device is a mobile telephone.

10. The electronic device according to claim 1, wherein the electronic device is at least one of a communicator, electronic organizer, personal digital assistant, smart phone, portable communication apparatus, portable gaming device, or portable media devices.

11. A method for setting fingers of a Rake receiver, said receiver including a combiner for combining de-spreaded signals and a predetermined number of fingers, comprising:

identifying channel taps in a received signal;

placing at least one finger of the predetermined number of fingers at a location corresponding to an identified channel tap; and placing at least one unplaced finger of the predetermined number of fingers at a location based on an estimated signal-to-interference ratio at an output of the combiner.

12. The method according to claim 11, wherein placing includes allocating a first fixed number of fingers of the predetermined number of fingers for placement at locations corresponding to the channel taps, and allocating a second fixed number of fingers of the predetermined number of fingers for placement based on the estimated S/I at the combiner output.

13. The method according to claim 11, wherein placing includes dynamically allocating each finger of the predetermined number of fingers between channel taps and estimated S/I.

14. The method according to claim 13, wherein allocating includes allocating each finger based on signal conditions.

15. The method according to claim 11, further comprising applying a weight factor to each finger of the predetermined number of fingers.

16. The method according to claim 15, wherein applying the weight factor to each finger includes applying the weight factor to each finger based on signal strength and on S/I.

17. The method according to claim 15, further comprising dynamically changing the weight factor based on signal conditions.

18. An electronic device (10), comprising:

a Rake receiver (14) for receiving wireless signals, said Rake receiver including a predetermined number of fingers (58) and a combiner (60) for combining de-spreaded signals;

a channel detection circuit (14a) configured to monitor signal energy collected from different delayed versions of a received signal and identify parts of the monitored signal energy that have high signal energy relative to other parts of the received signal; and a placement circuit (14b) configured to place a finger of the predetermined number of fingers at a location corresponding to the identified relatively high signal energy, wherein unplaced fingers of the predetermined number of fingers are placed at locations based on an estimated signal-to-interference ratio (S/I) at an output of the combiner.

* * * * *